(12) United States Patent
Lehtinen et al.

(10) Patent No.: US 9,374,127 B2
(45) Date of Patent: Jun. 21, 2016

(54) BALANCING METHOD OF TUNABLE DUPLEXER

(71) Applicant: Broadcom Corporation, Irvine, CA (US)

(72) Inventors: Teijo Henrikki Lehtinen, Helsinki (FI); Antti Oskari Immonen, Helsinki (FI)

(73) Assignee: BROADCOM CORPORATION, Irvine, CA (US)

( * ) Notice: Subject to any disclaimer, the term of this patent is extended or adjusted under 35 U.S.C. 154(b) by 368 days.

(21) Appl. No.: 14/107,272

(22) Filed: Dec. 16, 2013

(65) Prior Publication Data

US 2015/0172938 A1    Jun. 18, 2015

(51) Int. Cl.
| H04B 1/40 | (2015.01) |
| H04B 1/54 | (2006.01) |
| H04B 1/525 | (2015.01) |
| H04B 1/04 | (2006.01) |
| H04B 1/18 | (2006.01) |

(52) U.S. Cl.
CPC .................. *H04B 1/54* (2013.01); *H04B 1/525* (2013.01); *H04B 1/0458* (2013.01); *H04B 1/18* (2013.01)

(58) Field of Classification Search
CPC ........ H04B 1/0458; H04B 1/18; H04B 1/525; H04B 1/54
USPC ............................................................ 455/77
See application file for complete search history.

(56) References Cited

U.S. PATENT DOCUMENTS

| 2011/0053539 | A1 | 3/2011 | Sundstrom et al. |
| 2011/0299435 | A1 | 12/2011 | Mikhemar et al. |
| 2011/0299436 | A1 | 12/2011 | Mikhemar et al. |
| 2011/0300814 | A1 | 12/2011 | Mikhemar et al. |
| 2013/0324057 | A1* | 12/2013 | Zhang ...................... H04B 1/40 455/77 |
| 2014/0227982 | A1* | 8/2014 | Granger-Jones ..... H04B 7/0404 455/77 |

OTHER PUBLICATIONS

Mikhemar, Darabi, Abidi: "A Multiband RF Antenna Duplexer on CMOS: design and performance"; Published in: Solid-State Circuits, IEEE Journal of (vol. 48, Issue 9) Date of Publication: Sep. 2013 (pp. 2067-2077).
Abdelhalem, Sherif, Gudem, Prasad S. and Larson, Lawrence E; "A Tunable differential duplexer in 90nm CMOS"; Conference Date: Jun. 17-19, 2012, Montreal, QC (pp. 101-104).

* cited by examiner

*Primary Examiner* — Wesley Kim
*Assistant Examiner* — Raj Chakraborty
(74) *Attorney, Agent, or Firm* — Oblon, McClelland, Maier & Neustadt, L.L.P

(57) ABSTRACT

An apparatus comprises a tunable duplexer configured to output a transmission signal to be wirelessly transmitted from the apparatus at a transmission frequency, and configured to input a reception signal wirelessly received by the apparatus at a reception frequency, a tuning device connected to the tunable duplexer, configured to control a balance between impedances of an antenna port and of a balance port of the tunable duplexer, a transmitting device configured to, during a predetermined time period, wirelessly transmit a specific transmission signal for calibration of the tunable duplexer, a receiving device configured to, during the predetermined time period, wirelessly receive the specific transmission signal transmitted by the transmitting device, and a measuring device configured to, during the predetermined time period, measure the power of the specific transmission signal received by the receiving device. The tuning device controls the balance based on the measured power of the specific transmission signal.

20 Claims, 9 Drawing Sheets

BALANCING METHOD OF TUNABLE DUPLEXER

BACKGROUND OF THE INVENTION

1. Field of the Invention

The present invention relates to a balancing method of a tunable duplexer usable e.g. in a multimode cellular transceiver. For example, an embodiment of the present invention is applicable to a 3GPP communication system.

2. Related Background Art

Prior art which is related to this technical field can e.g. be found in:
[1] Mikhemar, Darabi, Abidi: "A Multiband RF Antenna Duplexer on CMOS: Design and Performance", http://ieeexplore.ieee.org/stamp/stamp.jsp?arnumber=6544685
[2] Abdelhalem, Gudem, Larson: "A tunable differential duplexer in 90 nm CMOS", http://ieeexplore.ieee.org/stamp/stamp.jsp?tp=&arnumber=6242241
[3] US 2011/299436 A1
[4] US 2011/299435 A1
[5] US 2011/300814 A1
[6] US 2011/053539 A1

The following meanings for the abbreviations used in this specification apply:
3GPP third generation partnership project
ADC analog-digital converter
BS base station
CMRR common mode rejection ratio
DSP digital signal processor
DTX discontinuous transmission
FDD frequency division duplexing
IL insertion loss
LNA low noise amplifier
LO local oscillator
LTE long term evolution
PA power amplifier
RF radio frequency
RX receiver
SW software
TDD time division duplexing
TX transmitter Multimode cellular transceivers cover a large number of frequency bands, and in conventional architectures each band has a separate duplex filter. The duplex filters are expensive and physically large components. Integrated electrical balance duplexers can cover several bands and are thus highly attractive especially for low cost commercial devices.

SUMMARY OF THE INVENTION

The invention aims at providing an improved balancing method of a tunable duplexer.

This is achieved by the subject matter of the appended claims.

According to an aspect of the invention, an apparatus comprises a tunable duplexer configured to output a transmission signal to be wirelessly transmitted from the apparatus at a transmission frequency, and configured to input a reception signal wirelessly received by the apparatus at a reception frequency, a tuning device connected to the tunable duplexer, configured to control a balance between an impedance of an antenna port of the tunable duplexer and an impedance of a balance port of the tunable duplexer, a transmitting device configured to, during a predetermined time period, wirelessly transmit a specific transmission signal for calibration of the tunable duplexer, a receiving device configured to, during the predetermined time period, wirelessly receive the specific transmission signal transmitted by the transmitting device, and a measuring device configured to, during the predetermined time period, measure the power of the specific transmission signal received by the receiving device, wherein the tuning device is configured to control the balance based on the power of the specific transmission signal, measured by the measuring device, during the predetermined time period for calibrating the tunable duplexer.

According to another aspect of the invention, a method for use in an apparatus comprising a tunable duplexer outputting a transmission signal to be wirelessly transmitted from the apparatus at a transmission frequency, and inputting a reception signal wirelessly received by the apparatus at a reception frequency, comprises, during a predetermined time period, wirelessly transmitting a specific transmission signal by a transmitting device of the apparatus, for calibration of the tunable duplexer, during the predetermined time period, wirelessly receiving the specific transmission signal transmitted by the transmitting device, by a receiving device of the apparatus, during the predetermined time period, measuring the power of the specific transmission signal received by the receiving device, and controlling a balance between an impedance of an antenna port of the tunable duplexer and an impedance of a balance port of the tunable duplexer based on the power of the specific transmission signal measured, during the predetermined time period for calibrating the tunable duplexer.

According to a further aspect of the invention, a computer-readable storage medium is provided that stores a program for causing a computer to execute, in an apparatus comprising a tunable duplexer outputting a transmission signal to be wirelessly transmitted from the apparatus at a transmission frequency, and inputting a reception signal wirelessly received by the apparatus at a reception frequency, the actions of, during a predetermined time period, causing wireless transmission of a specific transmission signal by a transmitting device of the apparatus, for calibration of the tunable duplexer, during the predetermined time period, causing wireless receipt of the specific transmission signal transmitted by the transmitting device, by a receiving device of the apparatus, during the predetermined time period, measuring the power of the specific transmission signal received by the receiving device, and controlling a balance between an impedance of an antenna port of the tunable duplexer and an impedance of a balance port of the tunable duplexer based on the power of the specific transmission signal measured, during the predetermined time period for calibrating the tunable duplexer.

Further aspects of the invention are defined in the dependent claims.

According to an embodiment of the invention, an advantage is achieved that adequate balance of a tunable duplexer is obtained before a high power TX signal is injected to an input of the tunable duplexer, which results in more time for fine tuning the balance and protects RX circuitry from high power TX signal.

In the following the invention will be described by way of embodiments thereof with reference to the accompanying drawings.

DESCRIPTION OF THE EMBODIMENTS

Generally, references to certain standards, media and/or resources in this description are rather supposed to be exemplary for the purpose of illustration in order to improve the ease of understanding of the invention. They are not to be understood as limiting the inventive concept. Likewise, the language as well as terms used herein, such as e. g. signal names, device names and the like, are to demonstrate the embodiments only. Use of such language or terms apart from their understanding according to this disclosure shall not be applied to the invention for the purpose of limiting its scope.

Generally, mobile devices may be user equipments (UE) such as cellular phones, smart phones, laptop's, handhelds, tablets, vehicles, machines, or special purpose means with a wireless connection to a communication counterpart, or the like. A mobile device may also be a module, a modem on module, a system in package or a system on chip which can be connected to or inserted in a user equipment. The user equipment may be fixed shape or it may have bendable form factor or it may be used in different form factors.

Although wireless communication is usually established via radio as a transmission resource, it may also be applied to ultrasonic, infrared light or the like as transmission resource.

Herein below, however, exemplary aspects of the invention will be described with reference to radio communication as wireless communication medium.

Isolation from a power amplifier (PA) to a low noise amplifier (LNA) of an electrical balance duplexer depends on the balance between a duplexer antenna port impedance Zout and a balance port impedance Zbal. An antenna impedance Zant usually varies enormously depending on the environment of the antenna. The balance between Zout and Zbal needs to be actively tuned by measuring a transmitter (TX) signal. However, there is a problem in that the balance needs to be at good level already before a high power TX signal is inserted into the electrical balance duplexer, because otherwise a receiver (RX) circuitry may be damaged by the high TX power signal and the inadequate balance deteriorates TX power level and UE reference sensitivity level.

Figure 1:
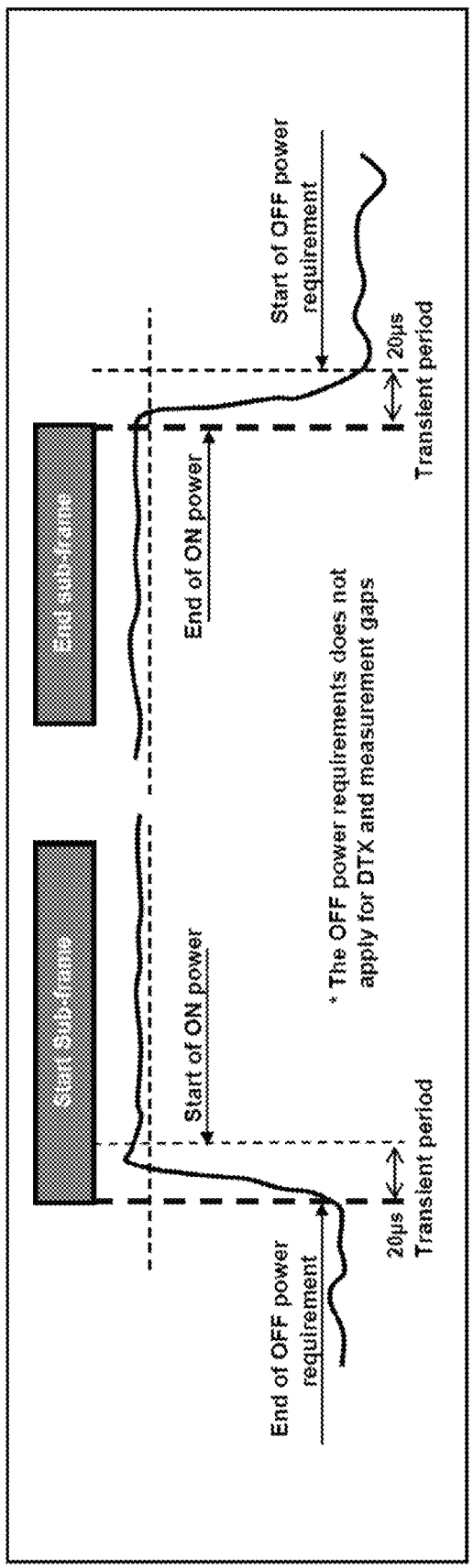
FIG. 1 shows a diagram illustrating an ON/OFF time mask.

FIG. 1 shows an ON/OFF time mask which defines an observation period between a transmit OFF and ON power and between a transmit ON and OFF power. ON/OFF scenarios include, e.g., a beginning or end of DTX, measurement gap, contiguous and non contiguous transmission. An OFF power period is defined in a duration of at least one sub-frame excluding any transient periods. The ON power is defined as the mean power over one sub-frame excluding any transient periods.

The balance between Zout and Zbal of the electrical balance duplexer needs to be attained before the first data bits are received by the RX circuitry. If balancing of the electrical balance duplexer is performed during the transient period shown in FIG. 1, there are less than 20 μs time to achieve the required balance, in order to have a proper balance before the first RX data bits are received at the time point labeled in FIG. 1 as "Start of ON power".

According to an embodiment of the invention, a primary balancing of the electrical balance (tunable) duplexer is performed during an OFF power period (OFF power requirement in FIG. 1), i.e. during the time when TX is assumed to be either completely OFF or below OFF power specification, by transmitting a TX signal either in a TX band with a carrier power below the OFF power limit or in another suitable frequency area such as in a duplex gap e.g. having emission limits below 1 GHZ limited to −36 dBm/100 kHz and above 1 GHz limited to −30 dBm/1 MHz, and measuring the TX signal e.g. from an RX LNA output to be described later on. This approach avoids a TX power leakage to the LNA input at the beginning of the balancing procedure, where the TX-RX isolation may be inadequate. In addition, a challenge of achieving the balance during the 20 μs transient period is reduced. For example, fine tuning of the balance can be performed during the transient period. The approach further comprises a 3GPP conformable balancing method for electrical balance duplexers.

The OFF power limit comprises an OFF power value defined according to 3GPP technical specifications, e.g. −56 dBm or −50 dBm, but other values are possible as well.

Figure 2:
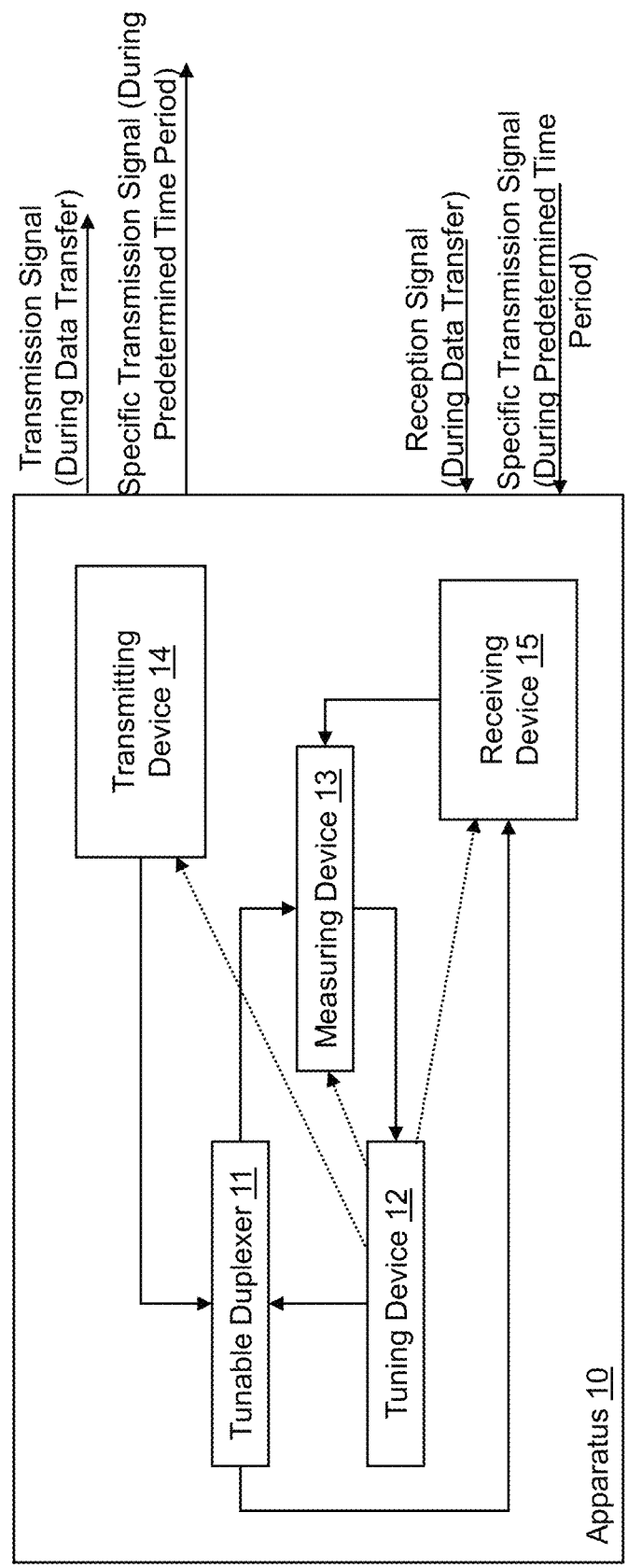
FIG. 2 shows a schematic block diagram illustrating a configuration of an apparatus according to an embodiment of the invention.

FIG. 2 shows a schematic block diagram illustrating a configuration of an apparatus 10 according to an embodiment of the invention. The apparatus 10 implements the above approach and comprises a tunable duplexer 11, a tuning device 12, a measuring device 13, a transmitting device 14 and a receiving device 15. The apparatus 10 is usable by a wireless device comprising e.g. a mobile device.

The tunable duplexer 11 is a filter which outputs a transmission signal to be wirelessly transmitted from the apparatus (e.g. by an antenna device not shown in FIG. 2) at a transmitting frequency and inputs a reception signal wirelessly received by the apparatus (e.g. by the antenna device not shown in FIG. 2) at a reception frequency.

According to an embodiment of the invention, the transmission signal is generated by the transmitting device 14 at the transmission frequency, amplified by a power amplifier (not shown in FIG. 2), and input to the tunable duplexer 11 which outputs the transmission signal towards an antenna device (not shown in FIG. 2) for being wirelessly transmitted from the apparatus 10. Further, the tunable duplexer 11 inputs the reception signal into a low noise amplifier (not shown in FIG. 2) which amplifies the reception signal and outputs it towards the receiving device 15.

The tuning device 12 is connected to the tunable duplexer 11 and controls a balance between an impedance Zout of an antenna port of the tunable duplexer 11 and an impedance Zbal of a balance port of the tunable duplexer 11.

During a predetermined time period, e.g. the above-described OFF power period, the transmitting device 14 wirelessly transmits a specific transmission signal for calibration of the tunable duplexer 11, the receiving device 15 wirelessly receives the specific transmission signal transmitted by the transmitting device 14, and the measuring device 13 measures the power of the specific transmission signal received by the receiving device 15. For example, the tuning device 12 comprises hardware and/or software for controlling the transmitting device 14 to transmit the specific transmission signal, for controlling the receiving device 15 to receive the specific transmission signal, and for controlling the measuring device 13 to measure the power of the specific transmission signal, which is indicated by dotted lines in FIG. 2. However, this example is not limiting, and it is also possible that there is a separate control unit for controlling the devices, or that control is present in another one of the devices or is split among the devices.

According to an embodiment of the invention, the specific transmission signal is generated by the transmitting device 14 at the transmission frequency, amplified by the power amplifier at a power below an OFF power limit, and input to the tunable duplexer 11 which outputs the specific transmission signal towards the antenna device for being wirelessly transmitted from the apparatus 10. According to another embodiment of the invention, the transmitting device 14 generates the specific signal at a specific frequency different from the transmission frequency. Further, the tunable duplexer 11 inputs the received specific transmission signal into the low noise amplifier which amplifies the received specific transmission signal and outputs it towards the receiving device 15.

The measuring device 13 measures the power of the received specific transmission signal and forwards the measurement result to the tuning device 12.

The tuning device 12 controls the balance based on the measured power of the specific transmission signal during the predetermined time period for calibrating the tunable duplexer 11.

According to an embodiment of the invention, course tuning of the balance is performed during the OFF power period, and fine tuning of the balance is performed during the transient period(s) shown in FIG. 1.

According to an embodiment of the invention, the tuning device 12 comprises at least one of an antenna impedance tuner (not shown in FIG. 2) for setting the impedance at the antenna port and a balance impedance tuner (not shown in FIG. 2) for setting the impedance of the balance port of the tunable duplexer 11.

According to an embodiment of the invention, the transmission signal to be input to the antenna impedance tuner is coupled to the measuring device 13 and the reception signal output from the antenna impedance tuner is coupled to the measuring device 13. The measuring device 13 measures the power of the transmission signal and the power of the reception signal, and the tuning device 12 sets a state of the antenna impedance tuner based on the measurement result from the measuring device 13 for calibrating the tunable duplexer 11. This aspect will be described in more detail later on.

Figure 9:
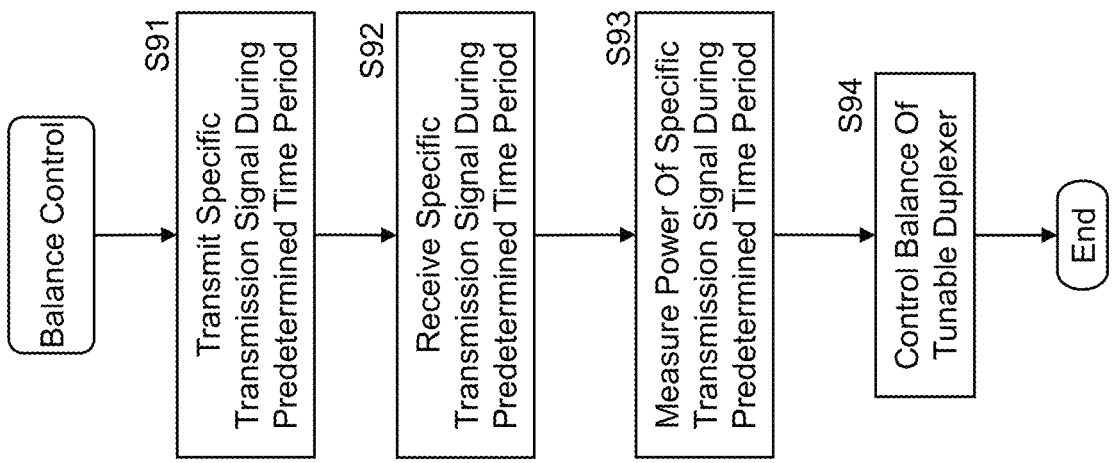
FIG. 9 shows a flowchart illustrating a method of controlling balance of a tunable duplexer according to an embodiment of the invention.

FIG. 9 shows a flowchart illustrating a method of controlling balance of a tunable duplexer according to an embodiment of the invention. The method may be used in the apparatus 10 of FIG. 2 for controlling balance of the tunable duplexer 11.

In step S91, during a predetermined time period, a specific transmission signal is wirelessly transmitted e.g. by using the transmitting device 14, for calibration of the tunable duplexer.

In step S92, during the predetermined time period, the specific transmission signal transmitted e.g. by using the transmitting device 14 is wirelessly received, e.g. by using the receiving device 15.

In step S93, during the predetermined time period, the power of the specific transmission signal received e.g. by using the receiving device is measured e.g. by using the measuring device 13.

In step S94, a balance between an impedance of an antenna port of the tunable duplexer and an impedance of a balance port of the tunable duplexer is controlled based on the power of the specific transmission signal measured, during the predetermined time period for calibrating the tunable duplexer. Then the process shown in FIG. 9 ends.

According to an embodiment of the invention, the specific transmission signal is transmitted at the transmission frequency of the apparatus 10 at a power below an OFF power limit. Alternatively, the specific transmission signal is transmitted at a specific frequency different from the transmission frequency of the apparatus 10.

According to an embodiment of the invention, the apparatus 10 comprises an antenna impedance tuner (not shown in FIG. 2) for setting the impedance at the antenna port of the tunable duplexer, and a coupler (not shown in FIG. 2) tapping the transmission signal to be input to the antenna impedance tuner and tapping the reception signal output from the antenna impedance tuner. Then, step S93 comprises measuring the power of the transmission signal and the power of the reception signal, and step S94 comprises setting a state of the antenna impedance tuner based on the measurement result for calibrating the tunable duplexer.

According to an embodiment of the invention, the apparatus 10 comprises a fine tuner (not shown in FIG. 2) for setting the impedance at the antenna port. Then, step S93 comprises measuring the power of the transmission signal and the power of the reception signal during a sub-frame, and step S94 comprises setting a state of the antenna impedance tuner based on the measurement result during the sub-frame, and setting a state of the fine tuner based on the measured power of the specific transmission signal during the predetermined time period for calibrating the tunable duplexer.

Figure 3:
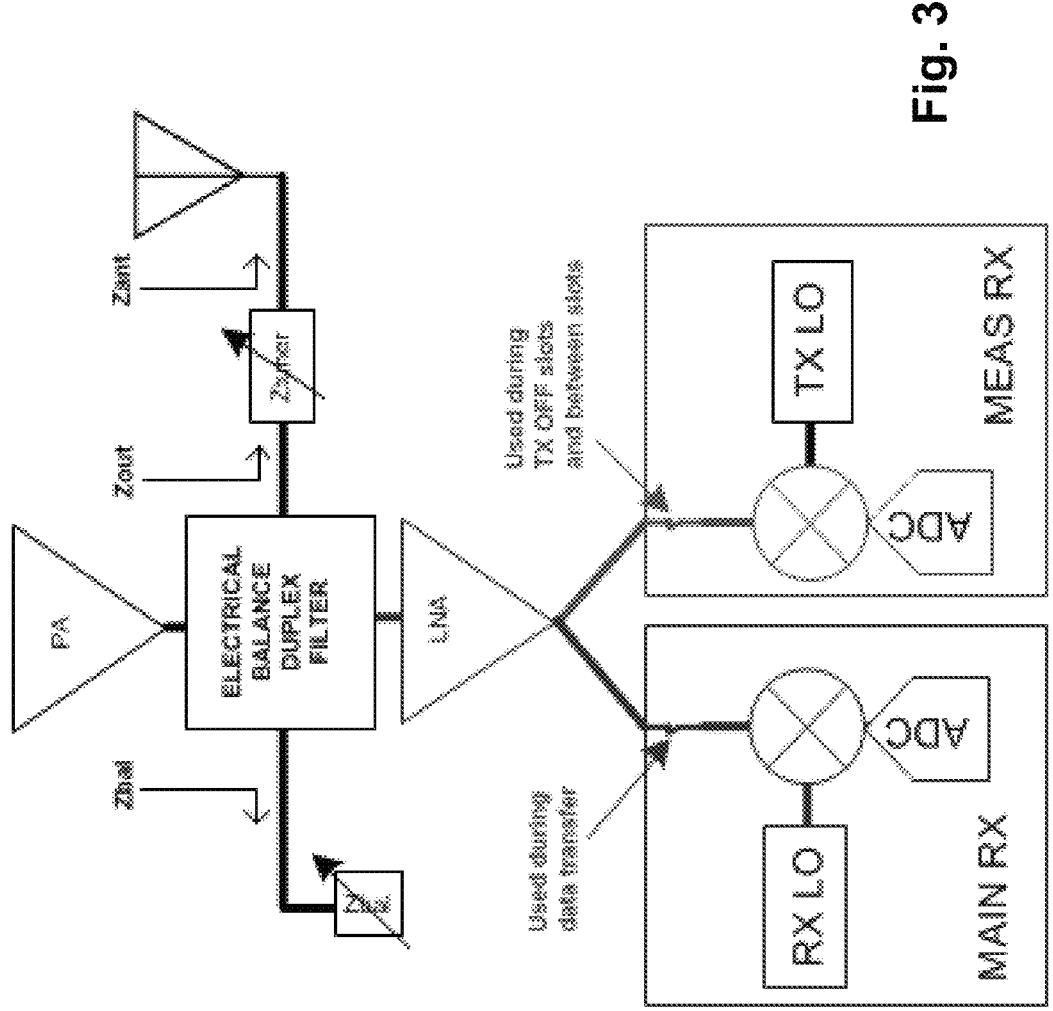
FIG. 3 shows a schematic block diagram illustrating a configuration of an apparatus according to a first implementation example of the invention.
Figure 4:
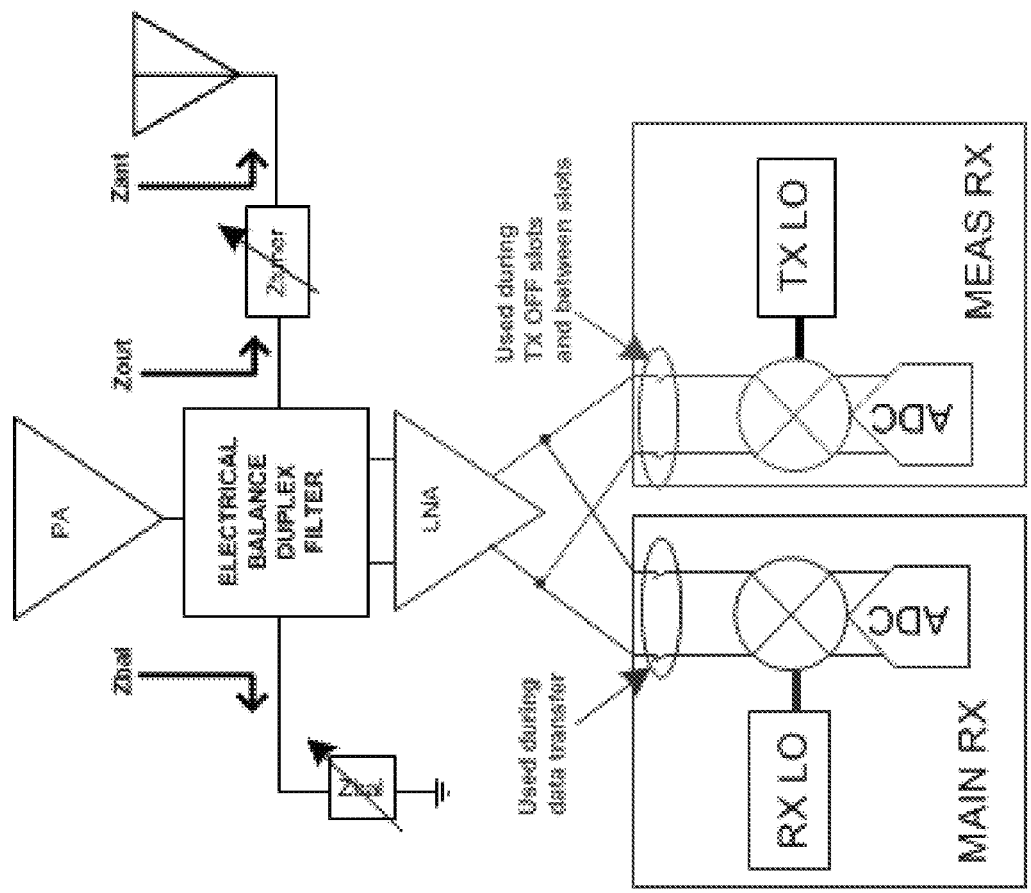
FIG. 4 shows a schematic block diagram illustrating a configuration of an apparatus according to a modification of the first implementation example.

Now reference is made to FIGS. 3 and 4 illustrating a configuration of an apparatus according to a first implementation example of the invention and a modification thereof. The apparatuses shown in FIGS. 3 and 4 implement functions of the apparatus 10 of FIG. 2.

The apparatuses shown in FIGS. 3 and 4 comprise an electrical balance duplex filter (tunable duplexer) connected between a PA (TX PA) and an LNA (RX LNA), having an antenna output port at an impedance Zout and a balancing output port at a tunable impedance Zbal. The antenna output port is connected to a tunable matching network Ztuner connected between the electrical balance duplex filter and an antenna device.

As mentioned before, electrical balance duplexer isolation from TX PA output to RX LNA input depends on "balance" between impedances Zbal and Zout. If the electrical balance duplex filter is symmetric for PA and LNA, the balance is achieved when Zbal and Zout are equal. A tunable duplexer can also be purposely asymmetric to optimize either RX IL or TX IL, in which case Zbal and Zout are not equal when they are "balanced" to a good or optimum TX-RX isolation. Thick lines in FIG. 3 represent single-ended lines, which depends on the selected circuit topology. FIG. 4 illustrates some of the thick lines of FIG. 3 as differential lines.

The apparatuses of FIGS. 3 and 4 further comprise a main receiver (MAIN RX) connected to the LNA, which connection is used during the data transfer as described above with reference to FIG. 2. The MAIN RX comprises a local oscillator at RX frequency for receiving the reception signal from the LNA, and an analog-to-digital converter ADC for converting the analog reception signal into a digital signal.

The apparatuses of FIGS. 3 and 4 further comprise a measurement receiver (MEAS RX) connected to the LNA, which connection is used during the above-described predetermined time period, e.g. during TX OFF slots (OFF power periods) and between slots (transient periods). The MEAS RX comprises a local oscillator at TX frequency (or the above-described specific frequency) for receiving the specific transmission signal from the LNA, and an analog-to-digital converter ADC for converting the analog specific transmission signal into a digital signal.

An antenna impedance Zant depends on nearby environment of the antenna device, and it can vary heavily during the normal use of a mobile device. Ztuner can be used to reduce the variation present at Zout. If the antenna impedance tuner is good enough, then the balance impedance Zbal can be fixed and Zout and Zbal balance can be achieved by varying Ztuner. But in practice tunable Zbal is needed for fine tuning of the balance. Alternatively also Ztuner can be fixed and Zbal can be tuned to balance the varying impedance Zout. But in that case the impedance levels present at PA and LNA vary, which can result in less than optimum PA and LNA performances.

When a wireless device is switched on or a TX frequency channel is changed, the antenna impedance can be far from a previous value. But since there is some time (~1 ms) before the TX ramp up where next TX frequency channel is known and −50 dBm TX OFF power is allowed, that time can be used for coarse tuning of the duplexer balancing network.

During the OFF power slot (OFF power period), a transmitter (TX) (not shown) transmits a signal at a power slightly below −50 dBm. The signal (specific transmission signal) may comprise an unmodulated carrier wave. The MEAS RX measures the signal from the RX LNA output. When Zbal and Zout are well balanced, the isolation from TX to LNA input is at most 50 dB, so that the power level at the LNA input is above −100 dBm. The balance can be optimized by measuring the change of the signal power at LNA output when the tunable balancing network setting is changed, in transient periods, and determining the next trial setting by an iterative algorithm. Such an algorithm can be integrated in digital HW, which makes the iteration loop very fast. It is to be noted that it is also possible to measure the signal power change at the LNA input.

Referring to FIGS. 2 to 4, functions of the tunable receiver 11 are implemented by the electrical balance duplex filter of FIGS. 3 and 4, functions of the tuning device 12 are implemented by tunable Zbal, Ztuner and digital HW having integrated the above-described algorithm, and functions of the measuring device 13 and receiving device 15 are implemented by the MEAS RX.

Figure 5:
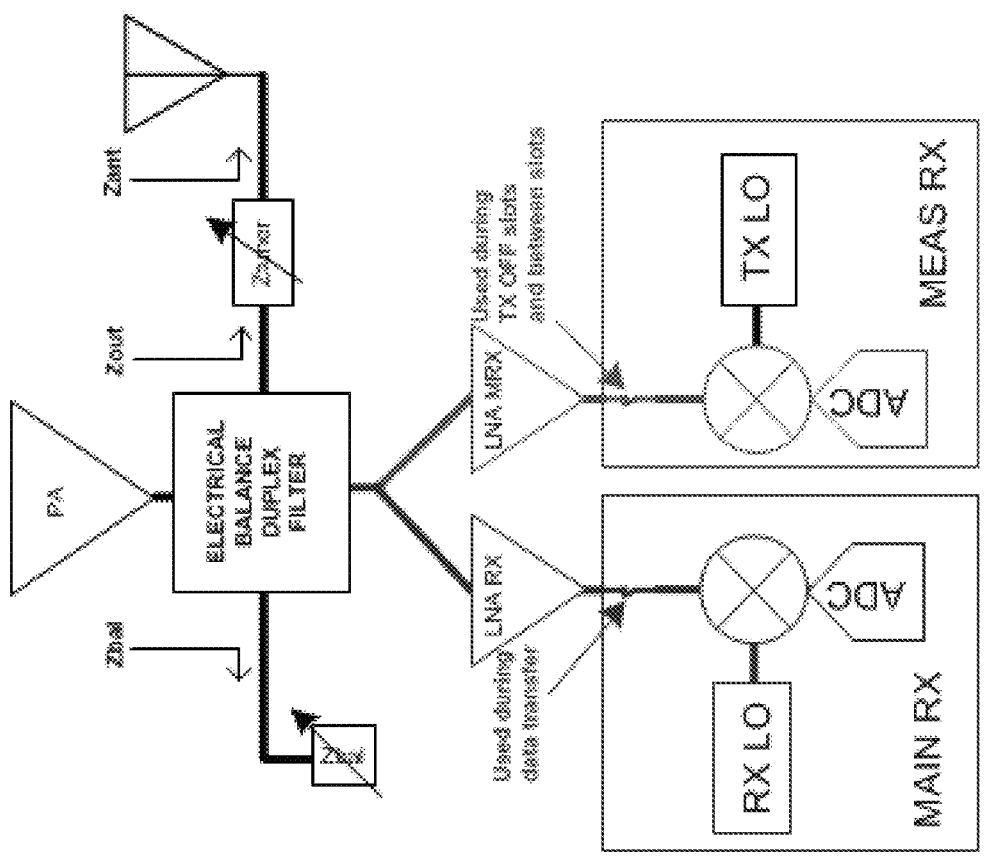
FIG. 5 shows a schematic block diagram illustrating a configuration of an apparatus according to a second implementation example of the invention.
Figure 6:
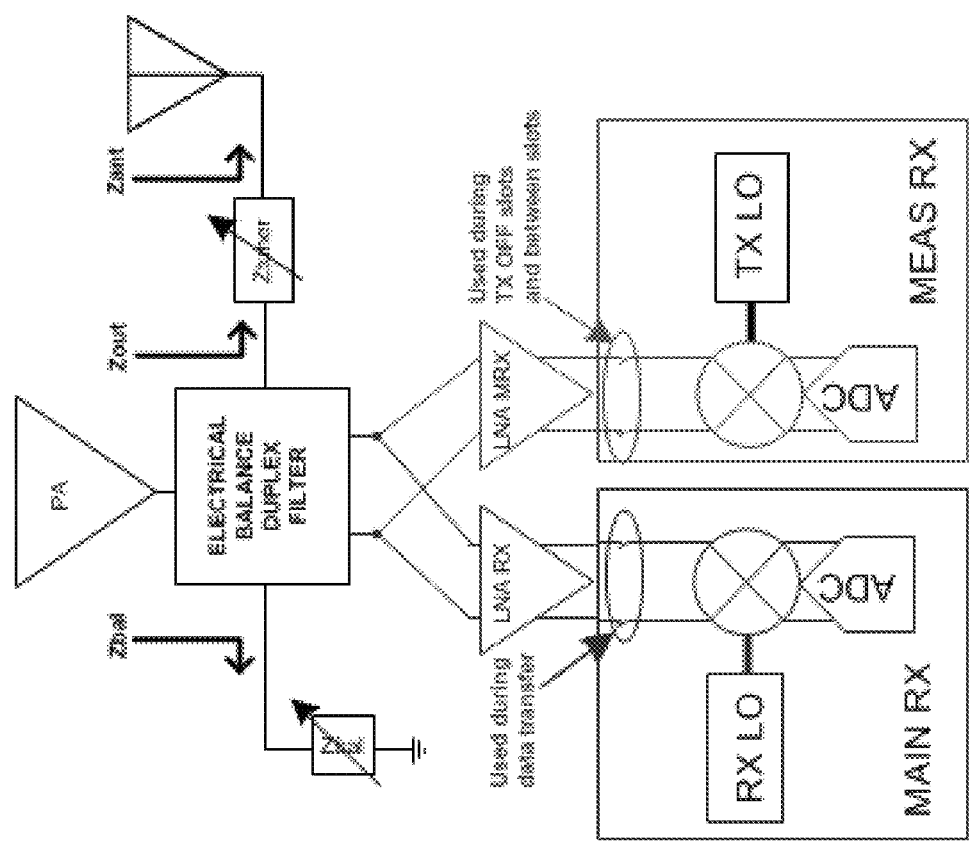
FIG. 6 shows a schematic block diagram illustrating a configuration of an apparatus according to a modification of the second implementation example.

Now reference is made to FIGS. 5 and 6 illustrating a configuration of an apparatus according to a second implementation example of the invention and a modification thereof. The apparatuses shown in FIGS. 5 and 6 implement functions of the apparatus 10 of FIG. 2.

The apparatuses of FIGS. 5 and 6 differ from those of FIGS. 3 and 4 in that an LNA MRX is provided for the MEAS RX. An input of the LNA MRX is connected to an input of an LNA RX provided for the MAIN RX, which improves the TX-RX isolation and reduces LNA loading.

Referring to FIGS. 2, 5 and 6, functions of the tunable receiver 11 are implemented by the electrical balance duplex filter of FIGS. 5 and 6, functions of the tuning device 12 are implemented by tunable Zbal, Ztuner and digital HW having integrated the above-described algorithm for determining the next trial setting for the tunable balancing network, and functions of the measuring device 13 and receiving device 15 are implemented by the MEAS RX and LNA MRX.

Figure 7:
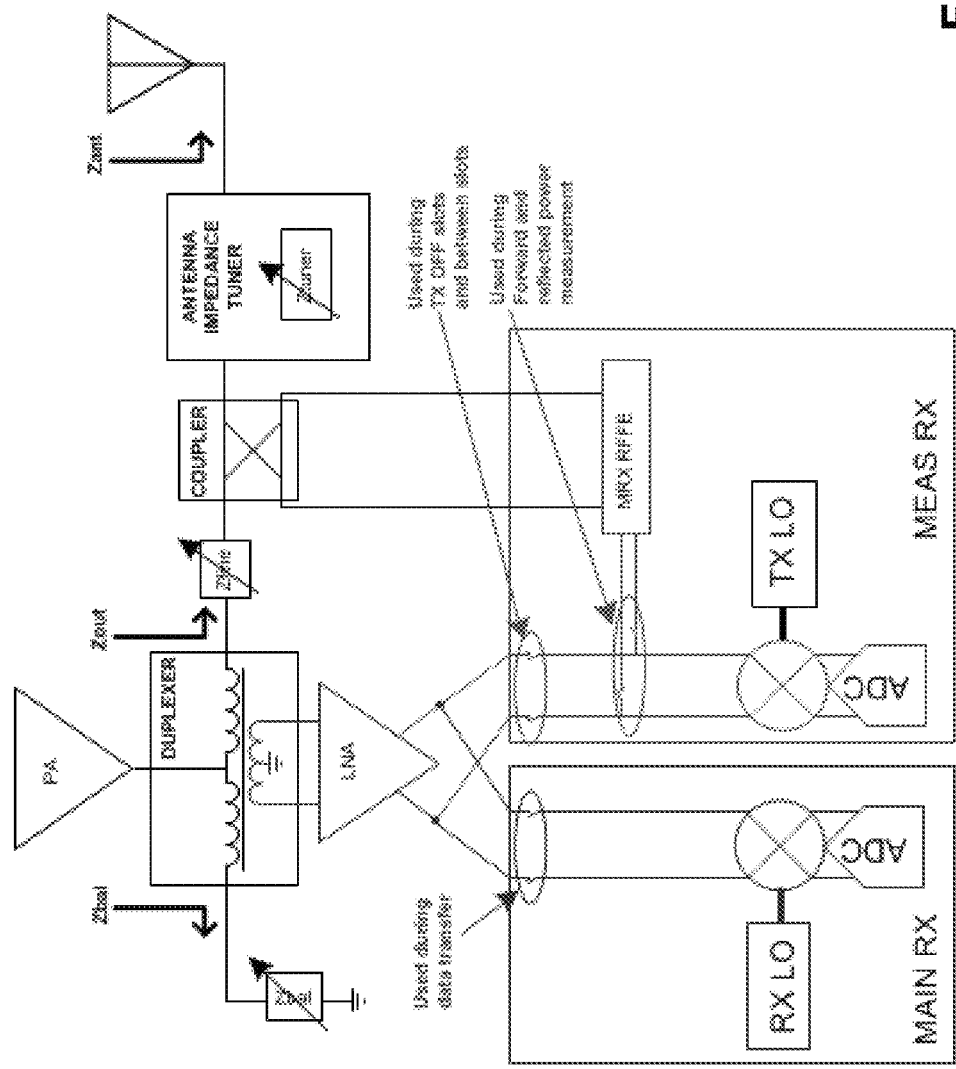
FIG. 7 shows a schematic block diagram illustrating a configuration of an apparatus according to a third implementation example of the invention.

Now reference is made to FIG. 7 illustrating a configuration of an apparatus according to a third implementation example of the invention. The apparatus shown in FIG. 7 implements functions of the apparatus 10 of FIG. 2.

The apparatus of FIG. 7 differs from the apparatus of FIG. 3 in that there is provided a coupler for forward and reflected power measurement and a fine tuner Zfine. The OFF power tuning and fine tuning during the transient period is performed by measuring signals from the LNA output as described before. However, in this implementation example also the forward and reflected power is monitored, which supports optimizing the antenna impedance tuning. For example, the forward and reflected power is measured during an LTE sub-frame as illustrated in FIG. 1, and a DSP (not shown) calculates the next tuner state. Then the tuner state is changed immediately after the sub-frame at the beginning of the 20 µs transient period. The fine tuning of the balance for the tuner state change is performed by measuring the TX leakage signal at the LNA output during the rest of the transient period.

As shown in FIG. 7, the MEAS RX further comprises an MRX RFFE connecting the transmission signal and reception signal during the data transfer (see FIG. 2) as obtained from the coupler for measuring the forward and reflected power using the TX LO and ADC of the MEAS RX.

Referring to FIGS. 2 and 7, functions of the tunable receiver 11 are implemented by the duplexer of FIG. 7, functions of the tuning device 12 are implemented by tunable Zbal, tunable Zfine, the antenna impedance tuner (Ztuner) and the above-described DSP, and functions of the measuring device 13 and receiving device 15 are implemented by the MEAS RX.

Figure 8:
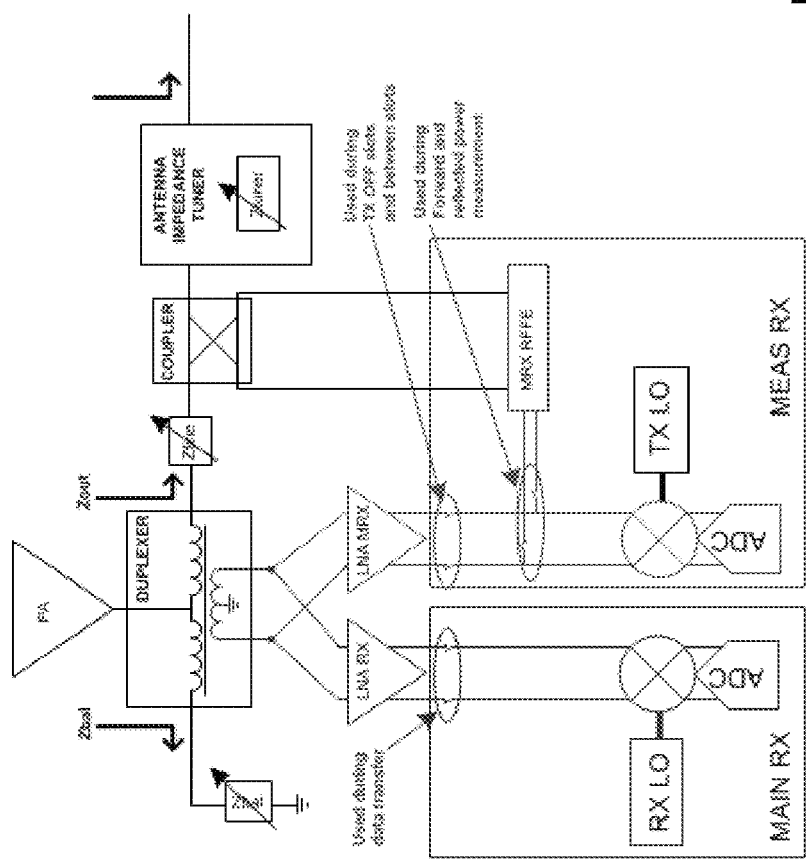
FIG. 8 shows a schematic block diagram illustrating a configuration of an apparatus according to a fourth implementation example of the invention.

Now reference is made to FIG. 8 illustrating a configuration of an apparatus according to a fourth implementation example of the invention. The apparatus shown in FIG. 8 implements functions of the apparatus 10 of FIG. 2.

The apparatus of FIG. 8 differs from the apparatus of FIG. 7 in that an LNA MRX is provided for the MEAS RX. An input of the LNA MRX is connected to an input of an LNA RX provided for the MAIN RX, which improves the TX-RX isolation and reduces LNA loading.

Referring to FIGS. 2 and 8, functions of the tunable receiver 11 are implemented by the duplexer of FIG. 8, functions of the tuning device 12 are implemented by tunable Zbal, tunable Zfine, the antenna impedance tuner (Ztuner) and the above-described DSP for calculating the next tuner state, and functions of the measuring device 13 and receiving device 15 are implemented by the MEAS RX and LNA MRX.

According to an embodiment of the invention, the specific transmission signal for calibrating the tunable duplexer is transmitted at a specific frequency different from the transmission frequency during data transfer. Duplex gap is suitable for coarse calibration because it has equal distance to TX and RX frequencies. The frequency (specific frequency) where the coarse calibration is done should be sufficiently "quiet" during the calibration. This needs to be checked before the TX of an UE in question is activated. The calibration can be done when there are no disturbances from other radios (noise level is ~50 dB below an assumed TX calibration power). If the intended measurement frequency (specific frequency) is too noisy, then other frequencies are tested before calibration.

According to an embodiment of the invention, if the coarse calibration is done in the band of the UE in question (i.e. at the transmission frequency as described with respect to FIG. 2), then disturbances from other UEs operating at the same carrier are possible. The amount of disturbances depends on the amount of UEs connected to adjacent cells. A BS scheduler allocates TX and RX "slots" for each UE in time domain. This means that when the UE in question is not receiving and/or transmitting, a UE next to the UE in question might be receiving and/or transmitting.

It should be noted that outside 3GPP defined cellular bands there either is radio traffic or there is not. Thus certain frequencies in certain regions are considered "safe" and some are considered "not preferred" for calibration purposes.

According to an aspect of the invention, an apparatus comprises filtering means for outputting a transmission signal to be wirelessly transmitted from the apparatus at a transmission frequency, and inputting a reception signal wirelessly received by the apparatus at a reception frequency, control means connected to the filtering means, for controlling a balance between an impedance of an antenna port of the filtering means and an impedance of a balance port of the filtering means, transmitting means for, during a predetermined time period, wirelessly transmitting a specific transmission signal for calibration of the filtering means, receiving means for, during the predetermined time period, wirelessly receiving the specific transmission signal transmitted by the transmitting means, and measuring means for, during the predetermined time period, measuring the power of the specific transmission signal received by the receiving means, wherein the control means controls the balance based on the power of the specific transmission signal, measured by the measuring means, during the predetermined time period for calibrating the filtering means.

Implementation examples of the filtering means, control means, transmitting means, receiving means and measuring means are e.g. the tunable duplexer 11, tuning device 12, transmitting device 14, receiving device 15 and measuring device 13 shown in FIG. 2.

According to an exemplary embodiment of the invention, the predetermined time period comprises one or more of at least a part of an OFF power period of the transmitting means, a transient period between an end of the OFF power period and a start of receiving first data bits of the reception signal by the receiving means and/or a transient period between an end of the receiving of the first data bits and a start of the OFF power period.

According to an exemplary embodiment of the invention, the apparatus comprises amplifying means, wherein the transmitting means generates a signal to be input to the filtering means at the transmission frequency via the amplifying means for amplifying the signal, wherein the filtering means outputs the amplified signal as the transmission signal, and wherein the transmitting means generates a specific signal to be input to the filtering means via the amplifying means for amplifying the specific signal, wherein the filtering means outputs the amplified specific signal as the specific transmission signal, and wherein the transmitting means generates the specific signal at the transmission frequency and the amplifying means amplifies the specific signal at a power below an OFF power limit, or wherein the transmitting means generates the specific signal at a specific frequency different from the transmission frequency.

The amplifying means may be implemented by the PA shown in FIGS. 3-8.

According to an exemplary embodiment of the invention, the OFF power limit comprises an OFF power value according to 3GPP specifications and the specific frequency comprises a frequency in a duplex gap.

According to an exemplary embodiment of the invention, the apparatus comprises at least one low noise amplifying means connected to the filtering means, for amplifying the reception signal input by the filtering means, wherein the filtering means is configured to input the specific transmission signal to the at least one low noise amplifying means which amplifies the specific transmission signal, and wherein the receiving means comprises a measuring receiver means for receiving the specific transmission signal amplified by the at least one low noise amplifying means, and the measuring means measures the power of the amplified specific transmission signal, wherein the control means controls the balance based on the measured power of the amplified specific transmission signal during the predetermined time period for calibrating the filtering means.

The low noise amplifying means and the measuring receiver means may be implemented by the LNA (MRX) and the MEAS RX shown in FIGS. 3-8.

According to an exemplary embodiment of the invention, the control means comprises an antenna impedance tuning means for setting the impedance at the antenna port of the filtering means, and wherein the apparatus comprises a coupling means for coupling the transmission signal to be input to the antenna impedance tuning means to the measuring means and coupling the reception signal output from the antenna impedance tuning means to the measuring means, wherein the measuring means measures the power of the transmission signal and the power of the reception signal, and wherein the control means sets a state of the antenna impedance tuning means based on the measurement result for calibrating the filtering means.

The antenna impedance tuning means and the coupling means may be implemented by the antenna impedance tuner and the coupler shown in FIGS. 7 and 8.

According to an exemplary embodiment of the invention, the control means comprises a fine tuning means for setting the impedance at the antenna port, wherein the measuring means measures the power of the transmission signal and the power of the reception signal during a sub-frame, and wherein the control means sets a state of the antenna impedance tuning means based on the measurement result during the sub-frame, and wherein the control means sets a state of the fine tuning means based on the measured power of the specific transmission signal during the predetermined time period for calibrating the filtering means.

The fine tuning means may be implemented by the unit denoted as 'Zfine' in FIGS. 7 and 8.

According to an exemplary embodiment of the invention, the receiving means comprises a main receiving means connected to the at least one low noise amplifying means, for processing the amplified reception signal.

The main receiving means may be implemented by the MAIN RX shown in FIGS. 3-8.

According to an exemplary embodiment of the invention, the apparatus comprises a first low noise amplifying means connected to the filtering means, for amplifying the reception signal input by the filtering means, the receiving means comprises a main receiving means connected to the first low noise amplifying means, for processing the amplified reception signal, and the apparatus comprises a second low noise amplifying means for amplifying the specific transmission signal, wherein an input of the second low noise amplifying means is connected to an input of the first low noise amplifying means, and wherein the measuring receiver means is connected to the second low noise amplifying means.

The first low noise amplifying means and the second low noise amplifying means may be implemented by the LNA RX and the LNA MRX shown in FIGS. 5, 6 and 8.

Embodiments of the present invention may be used with FDD and TDD communication radio link, intra band carrier aggregation, inter band carrier aggregation, contiguous and non-contiguous carrier aggregation, or the like. Furthermore, the user equipment UE radio communication links may use the same or different radio communication protocol/system and may have communication link to same or different communication counterpart.

Embodiments of the present invention may be implemented in software, hardware, application logic or a combination of software, hardware and application logic. The software, application logic and/or hardware generally reside on control modules of terminal devices or network devices.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention can advantageously be implemented in user equipments or smart phones, or personal computers connectable to such networks. That is, it can be implemented as/in chipsets, modem on modules, system on chip, system on chip to connected devices, and/or modems thereof.

As used in this application, the terms "device", "module" and "circuitry" refer to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition applies to all uses of those terms in this application, including in any claims.

As a further example, as used in this application, the terms "device", "module" and "circuitry" would also cover an implementation of merely a processor (or multiple processors) or portion of a processor and its (or their) accompanying software and/or firmware. The terms "device", "module" and "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims. Especially, the embodiments described may be combined in various manners so as to adapt the invention to individual requirements without departing from the scope of the invention.

It is also noted herein that while the above describes example embodiments of the invention, these descriptions should not be viewed in a limiting sense. Rather, there are several variations and modifications which may be made without departing from the scope of the present invention as defined in the appended claims.

We claim:

1. An apparatus comprising:
   a tunable duplexer configured to output a transmission signal to be wirelessly transmitted from the apparatus at a transmission frequency, and configured to input a reception signal wirelessly received by the apparatus at a reception frequency;
   a tuning device connected to the tunable duplexer, configured to control a balance between an impedance of an antenna port of the tunable duplexer and an impedance of a balance port of the tunable duplexer;
   a transmitting device configured to, during a predetermined time period, wirelessly transmit a specific transmission signal for calibration of the tunable duplexer;
   a receiving device configured to, during the predetermined time period, wirelessly receive the specific transmission signal transmitted by the transmitting device; and
   a measuring device configured to, during the predetermined time period, measure the power of the specific transmission signal received by the receiving device,
   wherein the tuning device is configured to control the balance based on the power of the specific transmission signal, measured by the measuring device, during the predetermined time period for calibrating the tunable duplexer.

2. The apparatus of claim 1, wherein the predetermined time period comprises one or more of at least a part of an OFF power period of the transmitting device, a transient period between an end of the OFF power period and a start of receiving first data bits of the reception signal by the receiving device and/or a transient period between an end of the receiving of the first data bits and a start of the OFF power period.

3. The apparatus of claim 1, comprising a power amplifier, wherein the transmitting device is configured to generate a signal to be input to the tunable duplexer at the transmission frequency via the power amplifier configured to amplify the signal, wherein the tunable duplexer is configured to output the amplified signal as the transmission signal, and wherein the transmitting device is configured to generate a specific signal to be input to the tunable duplexer via the power amplifier configured to amplify the specific signal, wherein the tunable duplexer is configured to output the amplified specific signal as the specific transmission signal, and wherein the transmitting device is configured to generate the specific signal at the transmission frequency and the power amplifier is configured to amplify the specific signal at a power below an OFF power limit, or wherein the transmitting device is configured to generate the specific signal at a specific frequency different from the transmission frequency.

4. The apparatus of claim 3, wherein the OFF power limit comprises an OFF power value according to 3GPP specifications and the specific frequency comprises a frequency in a duplex gap.

5. The apparatus of claim 1, wherein the apparatus comprises at least one low noise amplifier connected to the tunable duplexer and configured to amplify the reception signal input by the tunable duplexer, wherein the tunable duplexer is configured to input the specific transmission signal to the at least one low noise amplifier which is configured to amplify the specific transmission signal, and wherein the receiving device comprises a measuring receiver configured to receive the specific transmission signal amplified by the at least one low noise amplifier, and the measuring device is configured to measure the power of the amplified specific transmission signal, wherein the tuning device is configured to control the balance based on the measured power of the amplified specific transmission signal during the predetermined time period for calibrating the tunable duplexer.

6. The apparatus of claim 1, wherein the tuning device comprises an antenna impedance tuner for setting the impedance at the antenna port of the tunable duplexer, and wherein the apparatus comprises a coupler configured to couple the transmission signal to be input to the antenna impedance tuner to the measuring device and to couple the reception signal output from the antenna impedance tuner to the measuring device, wherein the measuring device is configured to measure the power of the transmission signal and the power of the reception signal, and wherein the tuning device is configured to set a state of the antenna impedance tuner based on the measurement result for calibrating the tunable duplexer.

7. The apparatus of claim 6, wherein the tuning device comprises a fine tuner for setting the impedance at the antenna port, wherein the measuring device is configured to measure the power of the transmission signal and the power of the reception signal during a sub-frame, and wherein the tuning device is configured to set a state of the antenna impedance tuner based on the measurement result during the sub-frame, and wherein the tuning device is configured to set a state of the fine tuner based on the measured power of the specific transmission signal during the predetermined time period for calibrating the tunable duplexer.

8. The apparatus of claim 5, wherein the receiving device comprises a main receiver connected to the at least one low noise amplifier, configured to process the amplified reception signal.

9. The apparatus of claim 5, comprising a first low noise amplifier connected to the tunable duplexer and configured to amplify the reception signal input by the tunable duplexer, the receiving device comprising a main receiver connected to the first low noise amplifier and configured to process the amplified reception signal, the apparatus comprising a second low noise amplifier configured to amplify the specific transmission signal, wherein an input of the second low noise amplifier is connected to an input of the first low noise amplifier, and wherein the measuring receiver is connected to the second low noise amplifier.

10. A method for use in an apparatus comprising a tunable duplexer outputting a transmission signal to be wirelessly transmitted from the apparatus at a transmission frequency, and inputting a reception signal wirelessly received by the apparatus at a reception frequency, the method comprising:
during a predetermined time period, wirelessly transmitting a specific transmission signal by a transmitting device of the apparatus, for calibration of the tunable duplexer;
during the predetermined time period, wirelessly receiving the specific transmission signal transmitted by the transmitting device, by a receiving device of the apparatus;
during the predetermined time period, measuring the power of the specific transmission signal received by the receiving device; and
controlling a balance between an impedance of an antenna port of the tunable duplexer and an impedance of a balance port of the tunable duplexer based on the power of the specific transmission signal measured, during the predetermined time period for calibrating the tunable duplexer.

11. The method of claim 10, wherein the specific transmission signal is transmitted at the transmission frequency at a power below an OFF power limit, or wherein the specific transmission signal is transmitted at a specific frequency different from the transmission frequency.

12. The method of claim 10, wherein the apparatus comprises an antenna impedance tuner for setting the impedance at the antenna port of the tunable duplexer, and a coupler tapping the transmission signal to be input to the antenna impedance tuner and tapping the reception signal output from the antenna impedance tuner, the method comprising:
measuring the power of the transmission signal and the power of the reception signal; and
setting a state of the antenna impedance tuner based on the measurement result for calibrating the tunable duplexer.

13. The method of claim 12, wherein the apparatus comprises a fine tuner for setting the impedance at the antenna port, the method comprising:
measuring the power of the transmission signal and the power of the reception signal during a sub-frame;
setting a state of the antenna impedance tuner based on the measurement result during the sub-frame; and
setting a state of the fine tuner based on the measured power of the specific transmission signal during the predetermined time period for calibrating the tunable duplexer.

14. A non-transitory computer-readable storage medium storing a program for causing a computer to execute, in an apparatus comprising a tunable duplexer outputting a transmission signal to be wirelessly transmitted from the apparatus at a transmission frequency, and inputting a reception signal wirelessly received by the apparatus at a reception frequency, the actions of:
during a predetermined time period, causing wireless transmission of a specific transmission signal by a transmitting device of the apparatus, for calibration of the tunable duplexer;
during the predetermined time period, causing wireless receipt of the specific transmission signal transmitted by the transmitting device, by a receiving device of the apparatus;
during the predetermined time period, measuring the power of the specific transmission signal received by the receiving device; and
controlling a balance between an impedance of an antenna port of the tunable duplexer and an impedance of a balance port of the tunable duplexer based on the power of the specific transmission signal measured, during the predetermined time period for calibrating the tunable duplexer.

15. The non-transitory computer-readable storage medium of claim 14, wherein the specific transmission signal is transmitted at the transmission frequency at a power below an OFF power limit, or wherein the specific transmission signal is transmitted at a specific frequency different from the transmission frequency.

16. The non-transitory computer-readable storage medium of claim 14, wherein the apparatus comprises an antenna impedance tuner for setting the impedance at the antenna port of the tunable duplexer, and a coupler tapping the transmission signal to be input to the antenna impedance tuner and tapping the reception signal output from the antenna impedance tuner, the method comprising:
measuring the power of the transmission signal and the power of the reception signal; and
setting a state of the antenna impedance tuner based on the measurement result for calibrating the tunable duplexer.

17. The non-transitory computer-readable storage medium of claim 16, wherein the apparatus comprises a fine tuner for setting the impedance at the antenna port, the method comprising:
  measuring the power of the transmission signal and the power of the reception signal during a sub-frame;
  setting a state of the antenna impedance tuner based on the measurement result during the sub-frame; and
  setting a state of the fine tuner based on the measured power of the specific transmission signal during the predetermined time period for calibrating the tunable duplexer.

18. The non-transitory computer-readable storage medium of claim 14, wherein the apparatus comprises at least one low noise amplifier connected to the tunable duplexer and configured to amplify the reception signal input by the tunable duplexer, wherein the tunable duplexer is configured to input the specific transmission signal to the at least one low noise amplifier which is configured to amplify the specific transmission signal, and wherein the receiving device comprises a measuring receiver configured to receive the specific transmission signal amplified by the at least one low noise amplifier, and the measuring device is configured to measure the power of the amplified specific transmission signal, wherein the tuning device is configured to control the balance based on the measured power of the amplified specific transmission signal during the predetermined time period for calibrating the tunable duplexer.

19. The method of claim 10, wherein the apparatus comprises at least one low noise amplifier connected to the tunable duplexer and configured to amplify the reception signal input by the tunable duplexer, wherein the tunable duplexer is configured to input the specific transmission signal to the at least one low noise amplifier which is configured to amplify the specific transmission signal, and wherein the receiving device comprises a measuring receiver configured to receive the specific transmission signal amplified by the at least one low noise amplifier, and the measuring device is configured to measure the power of the amplified specific transmission signal, wherein the tuning device is configured to control the balance based on the measured power of the amplified specific transmission signal during the predetermined time period for calibrating the tunable duplexer.

20. The method of claim 19, wherein the receiving device comprises a main receiver connected to the at least one low noise amplifier, configured to process the amplified reception signal.

* * * * *